US000001058H

United States Statutory Invention Registration [19]

[11] Reg. Number: H1058

Herrick, deceased et al.

[43] Published: May 5, 1992

[54] TRANSDUCER FOR MEASURING THE SEPARATOR OF ROCKET STAGES

[76] Inventors: Roger A. Herrick, deceased, Santa Clara; Charlene Herrick, executrix, 825 Henrietta Ave., Sunnyvale, Calif. 94086

[21] Appl. No.: 501,069

[22] Filed: Mar. 28, 1990

[51] Int. Cl.[5] ..... G01B 7/04
[52] U.S. Cl. ..... 324/206
[58] Field of Search ..... 324/206

[56] References Cited

U.S. PATENT DOCUMENTS 3,039,391 6/1962 Lofthus ..... 324/206

*Primary Examiner*—Linda J. Wallace

[57] ABSTRACT

A sensor for a rocket system which provides information of rate of separation of stages after separation is desirable for telemetry. A simple sensor consists of a coil of wire on one body with the free end of the wire attached to another separating body. The wire has magnetic pulses pre-recorded on it. As the wire uncoils during separation the pulses on the wire are detected by a coil. The pulse signals are sent to the telemetry.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSDUCER FOR MEASURING THE SEPARATOR OF ROCKET STAGES

FIELD OF THE INVENTION

This invention pertains to a method and apparatus for measuring the displacement of a departing body.

BACKGROUND OF THE INVENTION

Multiple stage missiles require separation of stages at remote points in space. It is desirable to measure the separation rate to confirm separation.

OBJECTIVES OF THE INVENTION

It is therefore a primary objective of the present invention to provide a transducer to measure the separation of departing missile parts.

It is a further objective to make the transducer simple and reliable.

Other objectives are to make the transducer light and inexpensive.

SUMMARY OF THE INVENTION

This object to the invention and other objects, features and advantages to become apparent as the specification progresses are accomplished by the invention according to which, briefly seated, a coiled wire has magnetic pulses recorded on it, with the coil remaining on one body while the end of the wire is attached to the departing body. As the departing body pulls the wire off the coil the wire passes a head which detects the magnetic pulses.

LIST OF ADVANTAGES OF THE INVENTION

An important advantage of a the present invention is rate of separation of missile parts can be measured with a simple, inexpensive, and lightweight device.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

Glossary

The following is a glossary of elements and structural members as referenced and employed in the present invention.

10—housing
12—mounting holes
14—opening for magnetized wire
16—signal wire

18—electrical connector
20—hub
20—spindle
24—magnetized wire
26—knob on spindle
28—recess in housing
30—spindle brake pods
32—spider
34—slot in spindle
36—detector head
38—wire terminal

DESCRIPTION OF THE PREFERRED EMBODIMENTS

Figure 1:
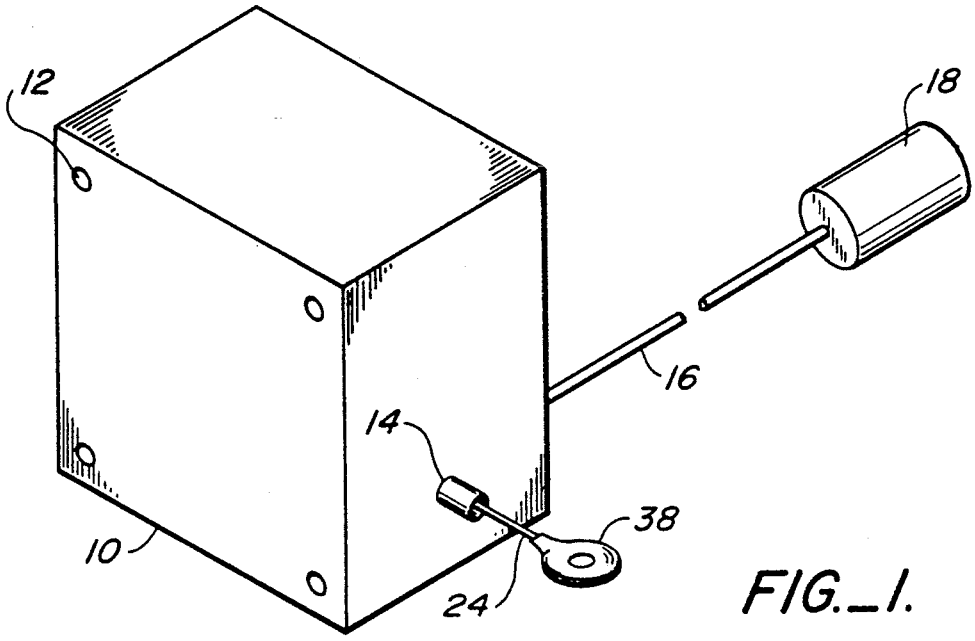
FIG. 1 shows a perspective view of the transducer according to the invention.

Referring now to the drawings wherein like reference numerals and used to designate like or corresponding parts throughout the various figures thereof, there is shown in FIG. 1 a perspective view of the displacement transducer assembly. A housing 10 mounting holes 12, an opening 14 for the wire to exit the housing 10, and a signal wire 16 with connector 18 carry the output signal.

Figure 2:
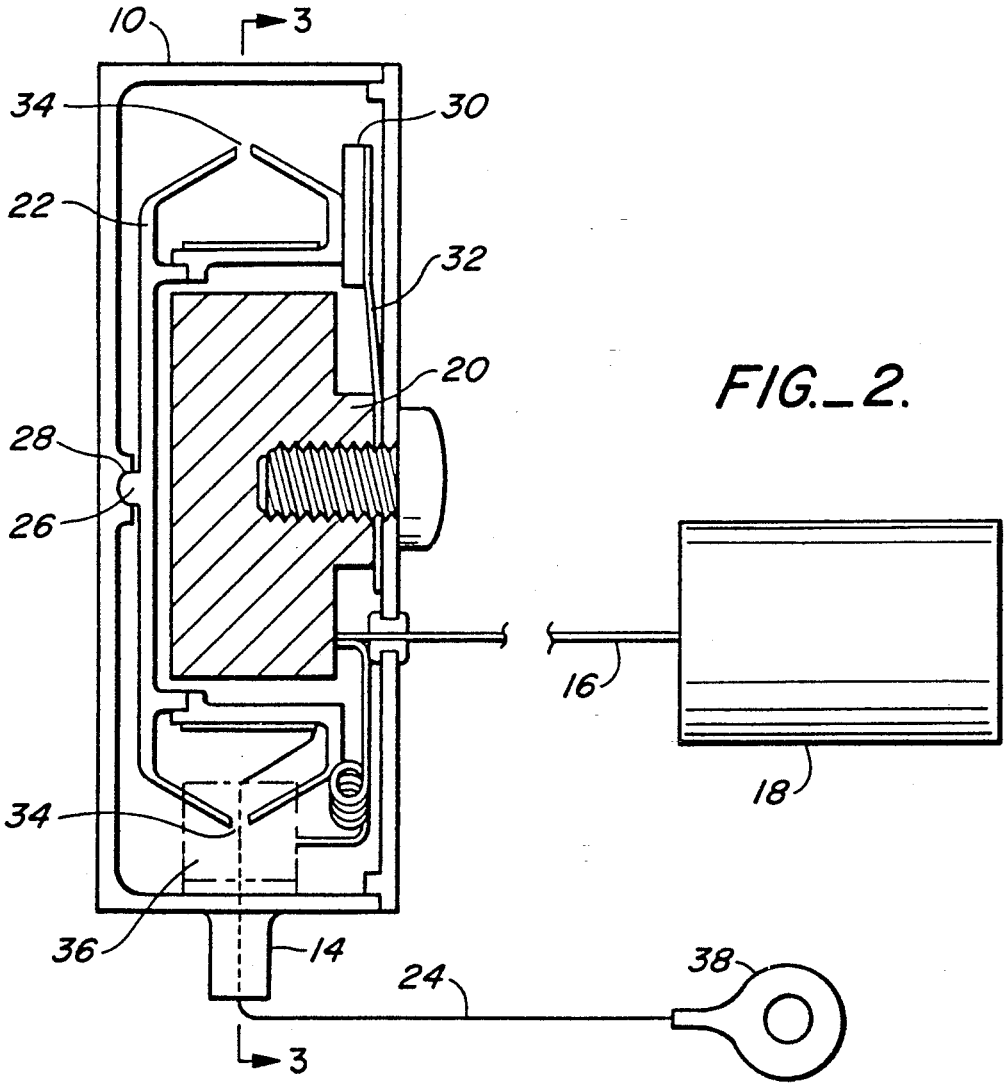
FIG. 2 shows a sectional view of the transducer of FIG. 1

FIG. 2 shows a section of the device. A hub 20 is mounted to the lid of the housing 10. A spindle 22 on which the magnetized wire 24 of steel or other suitable material is coiled rotates on the hub 20. On one side of the spindle 22 a knob 26 is formed which fits into a recess 28 in the housing 10.

Figure 3:
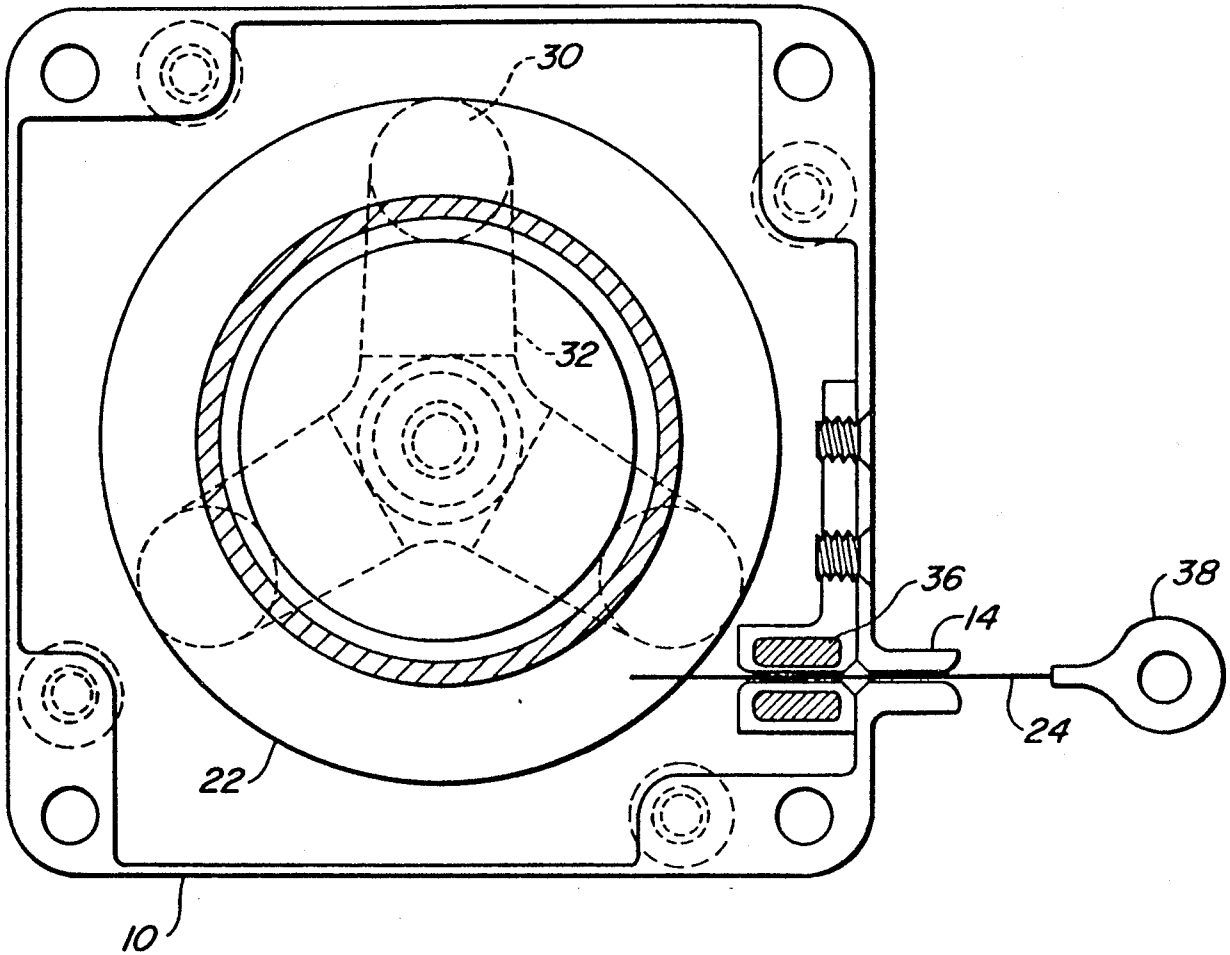
FIG. 3 shows a sectional view of the transducer of FIG. 2 along the section line A—A.

FIG. 3 shows another section of the device showing behind the spindle 22 brake pads 30 on a three-legged spider 32 of bronze or other material suitable for holding the pads 30 against the spindle 22. The wire 24 is guided through a slot 34 in the spindle through a head 36 which detects the magnetic pulses. The head 36 can be in the form of a coil with the wire passing along the axis of symmetry.

The frequency of the magnetic impulses is limited only by the response of the telemetry equipment and can be changed throughout the wire.

By using three of these devices the path of the departing body can be calculated.

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A transducer for measuring the displacement of a departing body in a rocket system comprising;

a coil of wire having magnetic pulses recorded on said wire, means of attaching a free end of said wire to the departing body, a means for rotatably mounting said coil on a second body, and a magnetic detector on said second body through which said wire passes as the body departs.

2. The transducer of claim wherein said pulses are imposed at uniform distances on said wire.

3. The transducer of claim 1 wherein said pulses are imposed at increasing distances from said free end.

* * * * *